June 22, 1965 R. TRUEMAN ETAL 3,190,964

AUTOMATIC TELEPHONE SYSTEMS

Filed Oct. 13, 1960 3 Sheets-Sheet 1

INVENTOR
ROY TRUEMAN
COLIN WARSOP
BY
Craig and Freudenberg
ATTORNEY

AUTOMATIC TELEPHONE SYSTEMS

Filed Oct. 13, 1960 3 Sheets-Sheet 2

INVENTORS
ROY TRUEMAN
COLIN WARSOP

BY Craig & Freudenberg

ATTORNEYS

AUTOMATIC TELEPHONE SYSTEMS

Filed Oct. 13, 1960

INVENTORS
ROY TRUEMAN
COLIN WARSOP
BY
Craig and Freudenberg
ATTORNEYS

United States Patent Office
3,190,964
Patented June 22, 1965

3,190,964

AUTOMATIC TELEPHONE SYSTEMS

Roy Trueman and Colin Warsop, Beeston, England, assignors to Ericsson Telephones Limited, London, England, a British company Filed Oct. 13, 1960, Ser. No. 62,393
Claims priority, application Great Britain, Oct. 16, 1959, 35,182/59
9 Claims. (Cl. 179—18)

The present invention relates to automatic telephone systems and is concerned with the detection of individual subscriber's line currents. In a typical system a subscriber's line current lies in the range 20 ma. to 50 ma. when the subscriber's handset is lifted (call being made or received), whilst when the handset is replaced only a small leakage current flows. Hence it is possible by detecting line current to determine whether a subscriber's handset is on or off the rest.

Such information is often necessary to enable an automatic exchange to function properly. For example, in a 2-wire TDM exchange it is necessary to identify which of two subscribers terminates a call. Arrangements are known which inspect the connecting channel between two subscribers and indicate when a call is terminated, but these are not able to indicate which subscriber terminates the call since the conditions in the connecting channels are the same whichever subscriber replaces his handset first.

The present invention makes it possible to determine when any specified subscriber replaces his handset, also when the subscriber lifts his handset and furthermore can be used to detect a call subscriber's dialling impulses.

According to the invention there is connected in the line circuit of a subscriber whose line current is to be detected an input winding coupled to a magnetic core of material having a hysteresis loop of the shape known in the art as rectangular, the core having further coupled thereto an output winding and a "read" winding connected to a source of "read" pulses and the arrangement being such that the minimum value of line current existing when the line circuit is completed is sufficient to switch the core from a datum, remanent state of magnetisation in one sense to the alternative sense of magnetisation whilst each "read" pulse is of the sense and sufficient amplitude to return the core from the alternative sense of magnetisation to the datum sense of magnetisation against the effect of the maximum value of line current existing when the line circuit is completed, whereby for the duration of any interval in which the line circuit is completed each "read" pulse causes an output pulse to appear in the output winding.

The terms minimum and maximum value of line current refer to the lower and upper limits of the range (e.g. 20 ma. to 50 ma.), within which the line current normally exists when the line circuit is completed and do not apply to values below and above these limits such as may sometimes occur as a result of a fault.

It will be understood that when the subscriber's handset is on its rest and only a small leakage current flows the core remains in its datum sense of magnetisation and "read" pulses only cause a minor hysteresis loop to be traversed, substantially no output being induced in the output winding. Whilst the handset is lifted each "read" pulse causes a major hysteresis loop to be traversed and a relatively large output pulse is induced in the output winding, indicating that the handset is raised.

It will also be understood that, when the line circuit is broken, the next read pulse automatically resets the core to the datum state. This gives the advantage that no separate polarising means for resetting cores to the datum state are required.

The arrangement according to the invention will almost invariably be installed at the exchange and one core will be provided for each subscriber's line. The output windings of a large number of cores may be connected in series and "read" pulses be applied in repeatedly time sequence to the "read" windings of different cores to test each subscriber's line in sequence.

It will readily be apparent that an indication will be given as any subscriber lifts his handset as a train of pulses occurring at times appropriate to that subscriber will be initiated, and their termination will indicate replacement of the handset. Furthermore, interruptions in the train of pulses will indicate dialling pulses at each of which the line circuit is opened at the dial impulsing springs.

It is preferred to couple the magnetic core to a subscriber's line circuit by means of two windings of the same number of turns rather than one only, one winding being in the wire from one terminal of the exchange battery to the subscriber equipment and the other in the wire from the other terminal of the battery to the subscriber equipment, the senses of the windings being such that current flowing from the positive to the negative terminal of the battery through the subscriber equipment produces in both windings a flux which tends to switch the core from the datum sense to the alternative sense of magnetisation.

Current surges in the line passing in the same direction along both wires of the line (such as are generated by lightning), will then have substantially no effect on the core.

A two-wire and earth line circuit is sometimes used, for example to connect a pair of subscribers to the exchange in a Party Line Calling System. There are then conditions when a line circuit is completed through one wire with earth return, through the other wire with earth return and through one wire with return through the other wire.

These different conditions may be sensed by coupling two cores into the two wires respectively. Read pulses may be applied to the two cores in common. The three different conditions listed above will then be indicated by the appearance of output pulses in the output winding of one core only, in the output winding of the other core only and in the output windings of both cores.

The magnetic cores are conveniently small annuli. The output windings, which need only to be a single turn, may be provided by a lead threading the annuli.

The invention will now be described by way of example with reference to the accompanying drawings in which.

Figure 1:
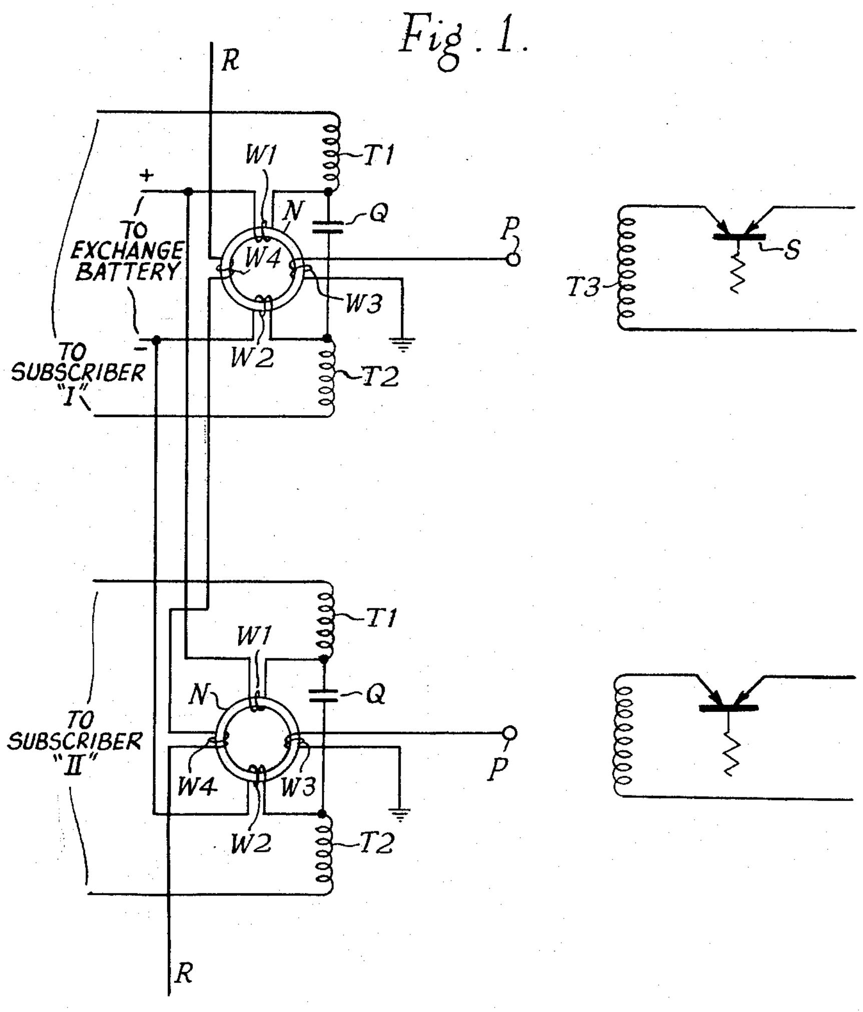
FIG. 1 is a circuit diagram.
Figure 2:
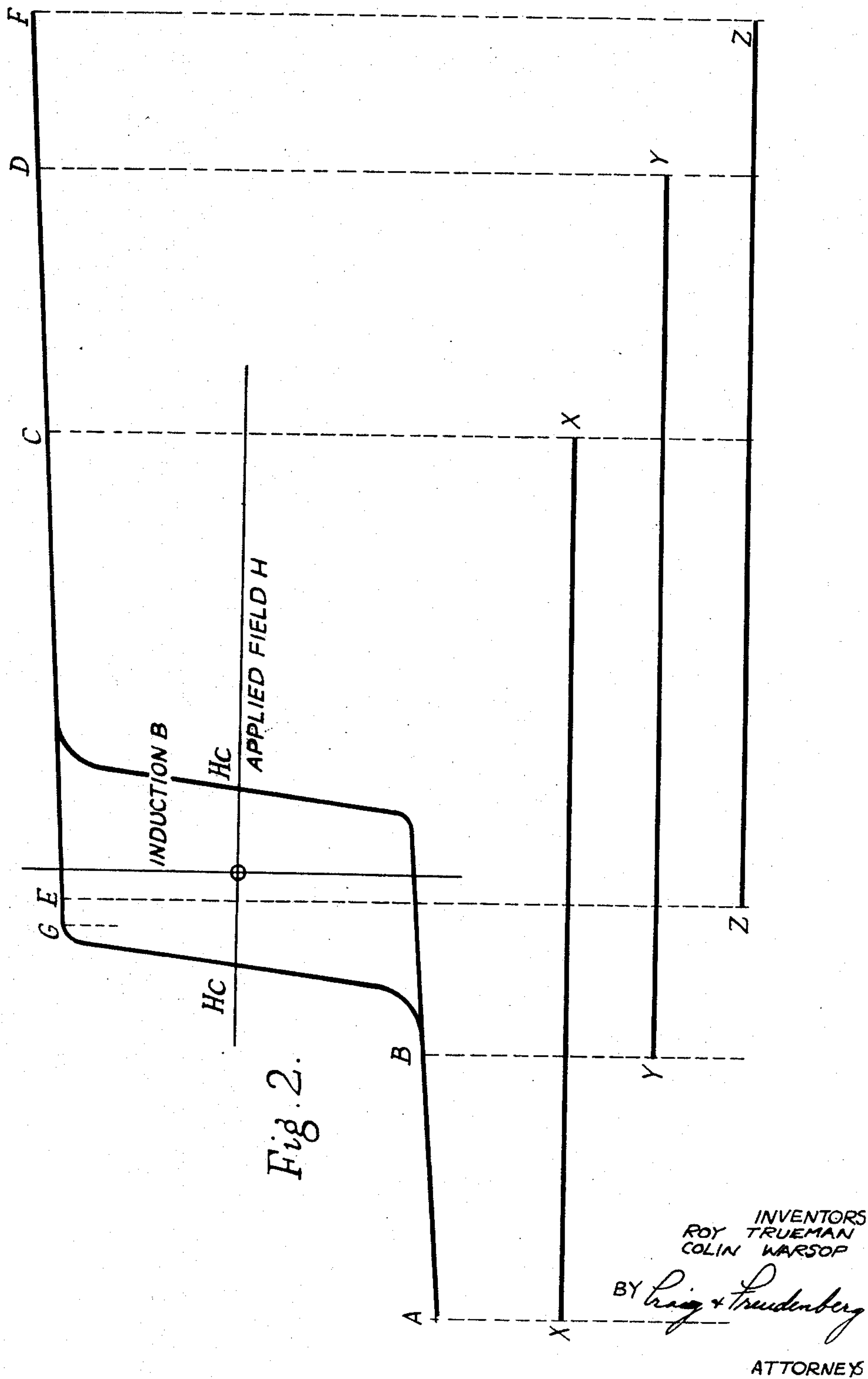
FIG. 2 is an explanatory diagram.

In FIG. 1 two subscribers' (I and II) line circuits are shown at the point where they are coupled conventionally into the exchange by means of two transformer windings T1 and T2 in the two wires of the line respectively and a transformer winding T3 connected to the exchange circuits through a symmetrical transistor S. Decoupling capacitors Q are provided between the windings T1 and T2. Magnetic core input windings W1 and W2 coupled to annular ferrite cores N of material having a hysteresis loop of the shape known in the art as rectangular are connected in series with transformer windings T1 and T2 respectively. Line current in both windings W1 and W2 produces a magnetic field H to the left in FIG. 2 which shows the hysteresis loop of the core material.

Each core is also provided with a "read" winding W3 connected between a terminal P and earth and an output winding W4. The windings W4 are connected in series in a lead RR which would in practice contain windings W4 pertaining to a much larger number of subscribers than two.

Lifting a subscriber's handset causes line current to flow through the windings W1 and W2 producing a magnetic field within the core of sufficient magnitude to render it magnetically saturated. Subscriber's line currents may differ widely, the maximum and minimum line currents being taken to be 50 ma. and 20 ma. In the saturated hysteresis loop of the core material shown in FIG. 2 the points A and B on the loop mark the degree of magnetisation produced by the 50 ma. and 20 ma. line currents.

Current pulses ("read" pulses) are applied in the winding W3 of the core by way of terminal P and these produce magnetisation within the core in a direction opposite to that produced by the line current. The lengths of the lines XX, YY, ZZ underneath the hysteresis loop in FIG. 2 and parallel to the H axis, represent the magnitude of the magnetic field produced by a "read" pulse. Each line starts from a point corresponding to a position on the hysteresis loop determined by the amount of bias magnetic field provided by the subscriber's line current. The lines are of the same length since the amplitude of the current pulse is indepndent of the amount of bias field applied. The magnitude of the magnetic field produced by the current pulses is arranged to be large enough to cancel out the effect of the field produced by the maximum (50 ma.) bias, and in addition to produce a field equal in magnitude but in the opposite sense to the field produced by the maximum bias current and the magnetic field produced by a current pulse in this case is denoted by XX in FIG. 2 and the core will thus switch symmetrically during the presence of maximum line current—i.e., around the hysteresis loop, the extremities of which are marked A and C in the figure. In the presence of minimum (20 ma.) line current, however, the core will switch from the point B to some point D on the highly saturated part of the hysteresis loop; the magnetic field produced by a current pulse being represented by YY. The core is thus switched around an asymmetrical hysteresis loop with extremities B and D. For line currents between 20 and 50 ma., therefore, the core will switch around a major hysteresis loop and pulses will be induced in the output winding W4.

If, however, only a smally line current (i.e. a leakage current) flows, a correspondingly small magnetic field is maintained in the core which is represented by the point E on the hysteresis loop. The "read" current pulse represented by ZZ will change the state of the core from that indicated by point E to that denoted by F on the saturated part of the loop. The core will now therefore be switched around a minor loop, the extremities of which are E and F, and not around the major loop. Hence, no pulses of significant amplitude will appear in the output winding W4. The leakage current must be small enough to produce a magnetic field smaller than that denoted by the joint G in the figure in order to prevent the core being driven around a major loop.

It should be noted that for both symmetrical and asymmetrical switching around major hysteresis loops the variation in coercive force with degree of saturation is very small. Therefore the design of the device is simplified if it is arranged for the core to switch between *saturated* states for all the values of line current (in the range 20–50 ma.) which may be applied to it. It should also be noted that the core may switch from an unsaturated state to a saturated one when line currents lower than 20 ma. are applied. The line current at which the core will commence to switch in this manner will of course depend upon the magnetic properties of the core material (particularly the coercive force) and since these properties will differ from core to core the magnitude of this current is difficult to predict. The tolerance on magnetic properties, however, is considered to be reasonably small and a line current appreciably greater than 5 ma. must be applied before a core will switch, and hence leakage current in excess of 5 ma. may be tolerated.

When it is required to test any particular subscriber a "read" pulse is applied to his terminal P and a resulting pulse in the lead RR indicates that the handset is off its rest. Pulses may be applied sequentially and repeatedly to all terminals P to provide a continual check on each subscriber.

Figure 3:
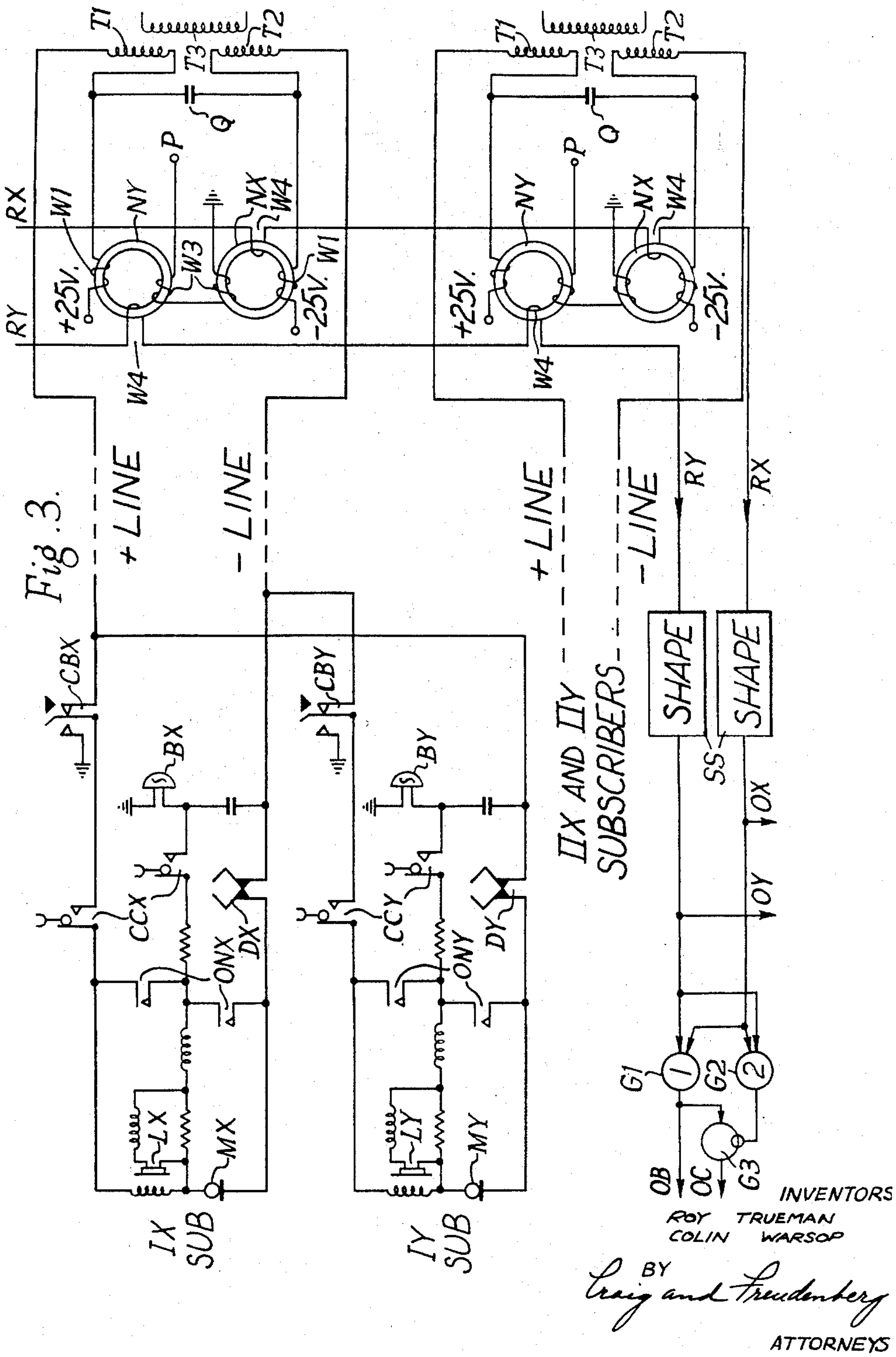
FIG. 3 is a circuit diagram of a modified circuit for use in the case of Party Line Calling.

In the modification of FIG. 3 the subscribers I and II are each replaced by a pair of subscribers using Party Line Calling. The subscriber equipment of one pair of subscribers IX and IY is shown schematically but will not be described in detail as it is conventional. It will be noted however that the subscriber IX's circuit includes a microphone MX, a receiver LX, an A. C. bell BX, cradle contacts CCX, dial impulsing springs DX and associated "Off Normal" contacts ONX and call button contacts CBX. These references with Y substituted for X indicate the like components of the circuit of the subscriber IY.

Each subscriber is connected between a +LINE connected through transformer winding T1 and to the +25 volts battery terminal and a −LINE connected through transformer winding T2 to the −25 volts battery terminal. Operation of the X subscriber's call button (with the handset raised and hence cradle contacts CCX closed), maintains a circuit through the −LINE, the return being by way of earth, but open-circuits the +LINE. On the other hand, operation of the Y subscriber's call button maintains a circuit through the +LINE but open-circuits the −LINE.

The single core N associated with the subscriber I in FIG. 1 is replaced by cores NX and NY coupled respectively into the −LINE and +LINE only by windings W1. The terminal P is coupled to both cores NX and NY by means of windings W3.

The exchange equipment just described is duplicated for the subscribers IIX and IIY. Both cores NX shown are coupled into a lead RX by means of windings W4 and both cores NY are coupled into a lead RY by means of windings W4. In practice the cores NX and NY of many pairs of party subscribers would be coupled into the leads RX and RY. Read pulses are applied to the terminals P in recurring sequence. It will be sufficient here to consider the operation when pulses are applied to the terminal P pertaining to the subscribers IX and IY only. In the first place, if either subscriber has his handset raised line current flows in both the +LINE and the −LINE. Read pulses applied at P therefore cause both cores NX and NY to traverse major hysteresis loops and pulses appear in both leads RX and RY. These are used to denote an ordinary "line busy" condition as subsequently explained. Moreover, interruption of the line circuit by means of the impulsing springs DX in dialing introduces the dialing information into the pulses appearing in the leads RX and RY as explained in connection with FIG. 1.

Matters are different when one of the subscribers initiates a call when, for a short interval of time, the subscriber has both his handset raised and his call button depressed. (He may lift his handset and then press the call button or hold down the call button and then lift the handset.) Assume that the subscriber IX initiates a call and that the contacts CCX are closed whilst the contacts CBX are changed over from the position shown in FIG. 3. The +LINE is open-circuited but the subscriber's end of the −LINE is earthed through contacts DX, CCX and CBX. Line current therefore flows in the −LINE and hence through the winding W1 on the core NX.

Read pulses applied to the terminal P cause pulses to appear in the lead RX only and these indicate not merely that the line is busy but that one of the subscribers, namely the X subscriber, is initiating a call and that a register is therefore required.

The leads RX and RY are connected through pulse-shaping circuits SS to outputs OX and OY, to a 1-gate G1 and to a 2-gate G2. Pulses in either or both leads RX and RY open the gate G1. Pulses then appear at an output OB and indicate simply that the line is busy. The gate G2 is opened only when pulses appear in both leads RX and RY. The output of the gate G2 is used to inhibit a gate G3 connected between the output of the gate G1 and a further output OC. Pulses therefore appear at OC only when pulses appear in one, but not both, of the leads RX and RY and indicate that a call is being initiated. At this time inspection of OX and OY will indicate whether an X subscriber of a Y subscriber is initiating the call.

Whilst in the foregoing it has generally been assumed that a subscriber's line circuit is completed by raising his handset, since this is the only common way in which this is effected, the invention is not of course limited to systems which so operate.

We claim:

1. An arrangement for detecting an individual subscriber's line current in an automatic telephone system comprising:

a subscriber's line circuit;

a magnetic core of material having a hysteresis loop of the shape known in the art as rectangular, the core having datum and alternative remanent magnetic states and being normally in the datum state during the open condition of said line circuit;

an input winding connected in the subscriber's line circuit and coupled to the magnetic core providing the sole means for setting the core to the alternative state;

an output winding coupled to the magnetic core;

a read winding coupled to the magnetic core;

and a source of read pulses connected to the read winding for resetting the core to the datum state said read pulses being of a polarity capable of producing a magnetization in said core opposite to the magnetization produced by said input winding;

the number of turns of the input winding being sufficient for the minimum value of the line current existing when the line circuit is completed to switch the core from the datum state to the alternative state and the amplitude of the read pulses being sufficient to return the core from the alternative state to the datum state against the effect of the maximum value of line current existing when the line circuit is completed, whereby for the duration of any interval in which the line circuit is completed, each read pulse causes an output pulse to appear in the output winding.

2. An arrangement for detaching in sequence the individual line currents of a plurality of subscriibers in an automatic telephone system comprising for each subscriber:

a subscriber's line circuit;

a magnetic core of material having a hysteresis loop of the shape known in the art as rectangular, the core having datum and alternative remanent magnetic states and being normally in the datum state during the open condition of said line circuit;

an input winding connected in the subscriber's line circuit and coupled to the magnetic core providing the sole means for setting the core to the alternative state;

an output winding coupled to the magnetic core;

a read winding coupled to the magnetic core;

and further comprising in common to all subscribers:

a source of read pulses having a polarity capable of producing a magnetization in said core opposite to the magnetization produced by said input winding;

means for coupling the source of read pulses in succession to all the read windings;

and an output circuit in which all the output windings are connected;

the number of turns of each input winding being sufficient for the minimum value of the line current existing when the line circuit is completed to switch the core from the datum state to the alternative state and the amplitude of the read pulses being sufficient to return any core from the alternative state to the datum state against the effect of the maximum value of line current existing when the line circuit is completed, whereby for the duration of any interval in which any line circuit is completed, each read pulse applied to the read winding of that line circuit causes an output pulse to appear in the output winding of that line circuit.

3. An arrangement for detecting the line current in a subscriber's line circuit in an automatic telephone system having an exchange battery with first and second terminals and first and second wires connecting the first and second terminals respectively to the subscriber's equipment, the arrangement comprising:

a magnetic core of material having a hysteresis loop of the shape known in the art as rectangular, the core having datum and alternative remanent magnetic states and being normally in the datum state during the open condition of said line circuit;

two input windings connected in the first and second wires respectively of the subscriber's line circuit and both coupled to the magnetic core providing the sole means for setting the core to the alternative state;

an output winding coupled to the magnetic core;

a read winding coupled to the magnetic core;

and a source of read pulses connected to the read winding for resetting the core to the datum state, said read pulses being of a polarity capable of producing a magnetization in said core opposite to the magnetization produced by said input winding;

the number of turns of the input windings being sufficient for the minimum value of the line current existing when the line circuit is completed to switch the core from the datum state to the alternative state and the amplitude of the read pulses being sufficient to return the core from the alternative state to the datum state against the effect of the maximum value of line current existing when the line circuit is completed, whereby for the duration of any interval in which the line circuit is completed, each read pulse causes an output pulse to appear in the output winding.

4. An arrangement for detecting either subscriber's line current in a two-wire and ground return line circuit party line calling system comprising:

a subscriber's party line circuit including two wires and a ground return line;

first and second magnetic cores of material having a hysteresis loop of the shape known in the art as rectangular, the cores having datum and alternative remanent magnetic states;

first and second input windings connected in the two wires respectively and coupled to the first and second cores respectively;

first and second output windings coupled to the first and second magnetic cores respectively;

first and second read windings coupled to the first and second magnetic cores respectively;

a common terminal connected to both read windings;

and a source of read pulses connected to the common terminal:

the number of turns of each input winding being sufficient for the minimum value of the line current existing when the line circuit is completed to switch the core from the datum state to the alternative state and the amplitude of the read pulses being sufficient to return either core from the alternative state to the datum state against the effect of the maximum value of line current existing when the line circuit is completed, whereby for the duration of any interval in which said line circuit is completed, each read pulse applied to the common terminal causes an output pulse to appear in the output winding of that line circuit.

5. An arrangement for detecting either subscriber's line current, in sequence for each of a plurality of two-wire and ground return line circuits in a party line calling system, comprising for each of a plurality of party line circuits:

a subscriber's party line circuit including two wires and a ground return line;

first and second magnetic cores of material having a hysteresis loop of the shape known in the art as rectangular, the cores having datum and alternative remanent magnetic states;

first and second input windings connected in the two wires respectively and coupled to the first and second cores respectively;

first and second output windings coupled to the first and second magnetic cores respectively;

first and second read windings coupled to the first and second magnetic cores respectively;

a common terminal connected to both read windings;

and further comprising in common to all said party line circuits:

a source of read pulses;

means for coupling the source of read pulses in succession to each of the said terminals;

a first output circuit in which all the said first output windings are connected;

and a second output circuit in which all the said second output windings are connected;

the number of turns of each input winding being sufficient for the minimum value of the line current existing when the line circuit is completed to switch the core from the datum state to the alternative state and the amplitude of the read pulses being sufficient to return any core from the alternative state to the datum state against the effect of the maximum value of line current existing when the line circuit is completed.

6. An arrangement according to claim 5, further comprising:

first and second output terminals;

gating means coupling the first and second output circuits to the first output terminal so that pulses appear at that terminal when pulses appear in either or both of the output circuits;

and gating means coupling the first and second output circuits to the second output terminal so that pulses appear at that terminal when pulses appear in either but not both of the output circuits.

7. In a automatic telephone system having a plurality of subscriber's circuits including an exchange battery and a plurality of subscriber lines, the improvement essentially consisting of an arrangement for detecting an individual subscriber's line current comprising in combination with each subscriber circuit:

a magnetic core of material having a hysteresis loop of the shape known in the art as rectangular, the core having datum and alternative remanent magnetic states and being normally in the datum state during the open condition of said line circuit;

an input winding connected in the subscriber's line circuit and coupled to the magnetic core providing the sole means for setting the core to the alternative state;

an output winding coupled to the magnetic core;

read winding means coupled to the magnetic core including a source of read pulses for resetting the core to the datum state said read pulses being of a polarity capable of producing a magnetization in said core opposite to the magnetization produced by said input windings;

the number of turns of the input winding being sufficient for the minimum value of the line current existing when the line circuit is completed to switch the core from the datum state to the alternative state and the amplitude of the read pulses being sufficient to return the core from the alternative state to the datum state against the defect of the maxium value of line current existing when the line circuit is completed, whereby for the duration of any interval in which the line circuit is completed, each read pulse causes an output pulse to appear in the output winding.

8. In an automatic telephone system having a plurality of subscriber circuits including an exchange battery and a plurality of subscriber lines, the improvement essentially consisting of an arrangement for detecting in sequence the individual line currents of a plurality of subscribers comprising for each subscriber;

a magnetic core of material having a hysteresis loop of the shape known in the art as rectangular, the core having datum and alternative remanent magnetic states and being normally in the datum state during the open condition of said line circuit;

an input winding connected in the subscriber's line circuit and coupled to the magnetic core providing the sole means for setting the core to the alternative state;

an output winding coupled to the magnetic core;

a read winding coupled to the magnetic core;

and further comprising in common to all subscribers:

a source of read pulses having a polarity capable of producing a magnetization in said core opposite to the magnetization produced by said input winding;

means for coupling the source of read pulses in succession to all the read windings;

and an output circuit in which all the output windings are connected;

the number of turns of each input winding being sufficient for the minimum value of the line current existing when the line circuit is completed to switch the core from the datum state to the alternative state and the amplitude of the repulses being sufficient to return any core from the alternative state to the datum state against the effect of the maximum value of line current existing when the line circuit is completed, whereby for the duration of any interval in which any line circuit is completed, each read pulse applied to the read winding of that line circuit causes an output pulse to appear in the output winding of that line circuit.

9. In an automatic telephone system having an exchange battery with first and second terminals and first and second wires connecting the first and second terminals respectively to the subcriber's equipment, the improvement essentially consisting of an arrangement for detecting the line current in a subscriber's line circuit comprising:

a magnetic core of material having a hysteresis loop of the shape known in the art as rectangular, the core having datum and alternative remanent magnetic states and being normally in the datum state during the open condition of said line circuit;

two input windings connected in the first and second wires respectively of the subscriber's line circuit and both coupled to the magnetic core providing the sole means for setting the core to the alternative state;

an output winding coupled to the magnetic core;

a read winding coupled to the magnetic core;

and a source of read pulses connected to the read winding for resetting the core to the datum state, said read pulses being of a polarity capable of producing a magnetization in said core opposite to the magnetization produced by said input winding;

the numbers of turns of the input windings being sufficient for the minimum value of the line current existing when the line circuit is completed to switch the core from the datum state to the alternative state and the amplitude of the read pulses being sufficient to return the core from the alternative state to the datum state against the effect of the maximum value of line current existing when the line circuit is completed, whereby for the duration of any interval in which the line circuit is completed, each read pulse causes an output pulse to appear in the output winding.

References Cited by the Examiner

UNITED STATES PATENTS

| | | | |
|---|---|---|---|
| 2,715,656 | 8/55 | Andrews | 179—18 |
| 2,715,658 | 8/55 | Dunlap et al. | 179—18 |
| 2,854,517 | 9/58 | Heetman | 179—18 |
| 2,870,261 | 1/59 | Van Lottum | 179—18 |
| 2,914,617 | 11/59 | Fritschi et al. | 179—18 |
| 2,942,239 | 6/60 | Eckert | 340—166 |
| 2,965,883 | 12/60 | Miller | 340—166 |
| 2,967,910 | 1/61 | Wilson et al. | 179—15 |

FOREIGN PATENTS

| | | | |
|---|---|---|---|
| 844,053 | 8/60 | Great Britain. | |

ROBERT H. ROSE, *Primary Examiner.*

L. MILLER ANDRUS, WALTER L. LYNDE, *Examiners.*